United States Patent [19]
Poupard et al.

[11] Patent Number: 4,855,022
[45] Date of Patent: Aug. 8, 1989

[54] METHOD FOR THE IMPREGNATION OF ELECTROLYTIC CAPACITORS WITH TETRACYANOQUINODIMETHANE SALTS

[75] Inventors: Dominique Poupard, Dijon; Jean-Marc Bureau, Villeban sur Yvette, both of France

[73] Assignee: Compagnie Europeenne de Composants Electroniques, Courbevoie, France

[21] Appl. No.: 304,457

[22] Filed: Feb. 1, 1989

[30] Foreign Application Priority Data

Feb. 5, 1988 [FR] France ............................. 88 01345

[51] Int. Cl.$^4$ ............................................. C25D 9/02
[52] U.S. Cl. ........................................................ 204/130
[58] Field of Search ......................................... 204/130

[56] References Cited

U.S. PATENT DOCUMENTS

4,768,130  8/1988  Bernard .............................. 361/323

FOREIGN PATENT DOCUMENTS

224207  6/1987  European Pat. Off. .
2113916  8/1983  United Kingdom .

*Primary Examiner*—T. M. Tufariello
*Attorney, Agent, or Firm*—Pollock, Vande Sande & Priddy

[57] ABSTRACT

A method for impregnating electrolytic capacitors by a tetracyanoquinodimethane (TCNQ) salt is disclosed. The method consists in introducing TCNQ salt into the capacitors by electrolytic means, with a solution consisting of a solvent, wherein TCNQ has been dissolved and which contains a support electrolyte, the cation of the support electrolyte and the dissolved TCNQ leading, after electrolytic dissociation, to said TCNQ salt. The method can be applied to the manufacture of aluminum electrolytic capacitors with solid electrolyte.

7 Claims, 1 Drawing Sheet

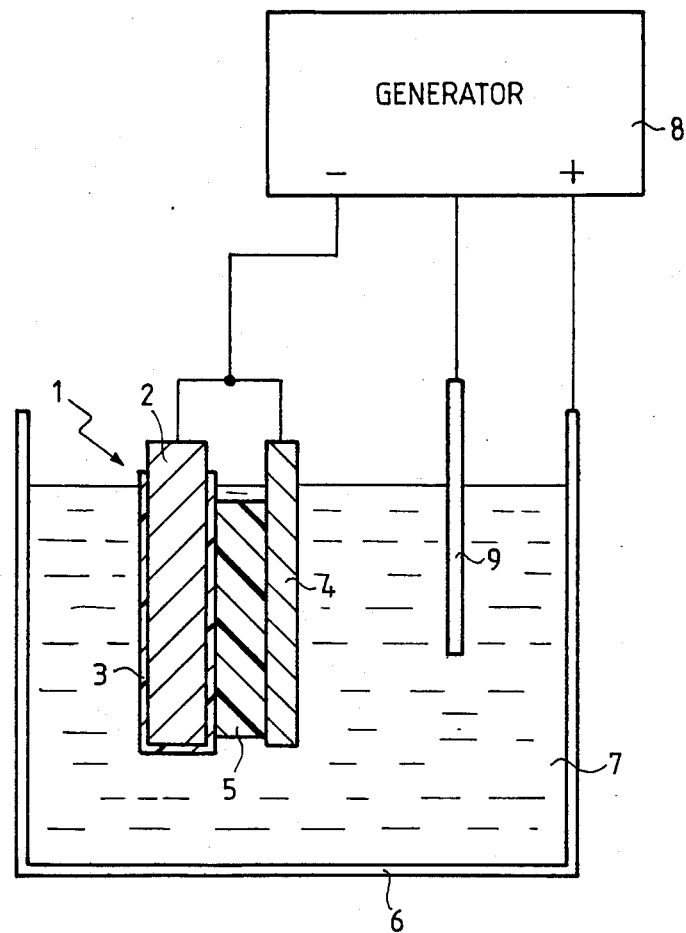

METHOD FOR THE IMPREGNATION OF ELECTROLYTIC CAPACITORS WITH TETRACYANOQUINODIMETHANE SALTS

BACKGROUND OF THE INVENTION

1. Field of the Invention

The present invention concerns the fabrication of electrolytic capacitors with solid, organic electrolyte and, more particularly, those where the base metal is aluminium.

2. Description of the Prior Art

Electrolytic capacitors are used especially because of their high capacitance in a restricted volume. At present, there are three classes of electrolytic capacitors in the market. There are aluminium and liquid electrolyte capacitors where the anode is made of aluminium and the cathode is an electrolytic liquid. There are also tantalum capacitors with solid electrolyte, where the anode is made of tantalum and the cathode is a solid semiconducting electrolyte. Finally, there are aluminium capacitors with solid electrolyte: the anode is made of aluminium and the cathode is a solid semiconducting electrolyte.

The last-named class of electrolytic capacitors has undoubtedly seen development recently. The firm Philips has developed several ranges of aluminium electrolytic capacitors with solid electrolyte. The anode is made with a rolled or folded foil. The manufacturing method using a anode in the form of foil comprises the following steps:

punching the aluminium foil,
etching the foil,
folding the etched aluminium foil in the case of radial capacitors or rolling it up in the case of axial capacitors,
anodization of the foil to form a thin film of alumina,
formation of the solid electrolyte (manganese dioxide) by impregnation of a manganese nitrate solution II followed by a pyrolysis operation;
positioning of a cathode contact.

The method used to manufacture these capacitors is fairly complicated. It comprises a one-by-one folding operation for radial capacitors or a one-by-one rolling operation for axial capacitors. The solid electrolyte forming step is the most difficult one. Several cycles of pyrolysis (four in principle) are required, and these cycles must take place under well-determined conditions relating to temperature and time. These are very difficult operations. For, the base product is a highly aggressive solution of manganese nitrate. The conversion into manganese dioxide has to be very fast. A postformation operation is needed to repair the layer damaged by the nitrogen dioxide resulting from the pyrolysis.

There is a method, known through the French patent FR No. 2 583 216, for the manufacture of electrolytic capacitors comprising a step for the winding of anode and cathode foils and and an electrolyte support on a large-diameter wheel. This method has the advantage of simplicity, obtained by the winding method. It can be used to obtain SMC (surface-mounted component) type components. The solid electrolyte used is preferably manganese oxide but the possibility of using an organic electrolyte is also mentioned. For example, it is possible to use 7, 7, 8, 8-tetracyanoquinodimethane (more commonly called TCNQ) salts. These salts are theoretically very valuable, but their use as electrolytes for capacitors raises many problems in implementation.

To overcome this drawback, the invention proposes a novel method which enables the impregnation of the oxidated anodes of capacitors by a TCNQ salt. This method is implemented by electrolytic means.

SUMMARY OF THE INVENTION

An object of the invention therefore, is a method for the impregnation of electrolytic capacitors by a tetracynanoquinodimethane (TCNQ) salt, consisting in the introduction of said salt into each capacitor by electrolytic means, using a solution formed by a solvent, wherein TCNQ has been dissolved, and containing a support electrolyte, the cation of the support electrolyte and the dissolved TCNQ leading, after electrolytic dissociation, to said TCNQ salt.

The invention will be better understood and its other advantages will emerge from the following description, given as a non-restrictive example, along with the appended figure, which illustrates the method of impregnation by electrolysis.

DESCRIPTION OF PREFERRED EMBODIMENTS

The 7, 7, 8, 8-tetracynanoquinodimethane (TCNQ), and especially N-n butylisoquinolinium of TCNQ, have the advantage of good electrical conductivity. This conductivity value is compatible with use in the manufacture of electrolytic capacitors.

RCNQ N-n butylisoquinolinium is normally formed in the state of powdery crystals. It is not easily fixed to filmogenic metals and, in particular, to aluminium. The studies made concerning the various techniques used for the adhesion of the TCNQ salts to this type of support have shown that the fixing of a TCNQ salt to a filmogenic metal having an anodized surface, by contact of the metal with the salt in the melted state, followed by its solidification, results in a solid electrolyte capacitor with excellent qualities. By this method, it is necessary for the liquefied TCNQ salt to be cooled fairly quickly to cause its solidification. For, the prolonged heating of the salt causes it to decompose. This method proves to be difficult to implement in a laboratory. It becomes all the more difficult to implement in industrial applications when a heating period has to be mastered in a reproducible way.

Among the properties of TCNQ salts mentioned in the literature on the subject (see, in particular, the "Journal of the American Chemical Society", 1962, pages 3374–3387), it can be noted that the complex TCNQ salts, with the general formula $M^{n+}(TCNQ\cdot^-)_n(TCNQ)_m$, where M represents the organic cation, has valuable polarographic characteristics. In acetonitrile, in a lithium perchlorate (0.1M) medium, the polarogram of the complex TCNQ salts on platinum consists of two waves corresponding to the polarographic curves of the neutral TCNQ salt and the anion radical $TCNQ\cdot^-$. They are connected to the redox semi-equations:

  (1)

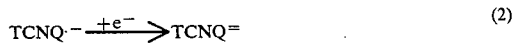  (2)

to which correspond the voltages of half-waves $e_{\frac{1}{2}}(1)$ and $e_{\frac{1}{2}}(2)$, i.e. respectively 0.127 V and −0.291 V with respect to a calomel reference electrode saturated in potassium chloride without water.

According to the invention, the impregnation method is carried out by electrolytic means. By way of a non-restrictive example, the rest of the description will relate to the impregnation of aluminium capacitors by TCNQ N-n butylisoquinolinium. Since the system (1) is reversible on an aluminium electrode, the method shall be conducted as follows.

To obtain the appropriate electrolytic solution, TCNQ, for example, is dissolved in acetonitrile containing a support electrolyte, the cation of which is N-n butylisoquinolinium+, for example N-n butylisoquinolinium hexafluorophosphate.

The elements to be impregnated may take different forms. They may be stacked type or wound type capacitors, with or without the interposition of an electrolyte support such as paper. To achieve the impregnation of a capacitor, the parts forming the anode, or the parts forming the cathode contact or, again, all these parts, are electrically connected to the negative pole of a voltage generator.

The appended figure illustrates the impregnation method according to the invention. The capacitive element 1 to be impregnated has been shown in the simplest possible way. It has an aluminium anode 2, coated with its oxide layer 3, a cathode contact 4 and a sheet of paper 5 enclosed between the oxidated anode and the cathode contact made of aluminium. The capacitive element is plunged into an electrolysis vessel 6 filled with an electrolytic solution 7. The anode 2 has a non-oxidated part which emerges from the electrolyte. It is seen to it that the non-oxidated part of the anode is not in contact with the electrolyte to prevent it from being impregnated. The anode and the cathode contact are electrically connected to the negative pole of the voltage generateor 8. If the vessel 6 is made of a conductive material, it may form an electrode and may be linked to the positive pole of the generator 8. The device may also have a calomel reference electrode 9 connected to the generator.

Since the electrolytic solution 7 is the one described above (formed by acetonitrile, in which TCNQ has been dissolved and which contains a support electrolyte, the cation of which is the N-n butylisoquinolinium+), the electrolysis enables the cathode reduction of the TCNQ:

$$TCNQ + e^- \rightarrow TCNQ \cdot^-$$

The anion radical TCNQ·− thus obtained gets combined with the cation of the support electrolyte and the neutral TCNQ to form the salt in question.

The salt thus obtained, which has little solubility in acetonitrile, will therefore coat the capacitive element 1. It can be seen to it that the cathode contact 4 is also coated: this will contribute to improving its adhesion to the capacitive element. Once the electrochemical reaction is achieved, the capacitor is washed, dried and then encapsulated. A subsequent heating step may be performed to melt the salt in order to improve its impregnation.

It should be be noted that, in this method, the cathode, which gives electrons by electrolysis to the TCNQ, plays the role of N-n butylisoquinolinium iodide which is the reducing agent in standard chemical synthesis.

The use of solvents other than acetonitrile comes within the scope of the invention. These solvents will be chosen according to their field of electro-activity and the TCNQ chosen.

The application of this method to base metals other than aluminium, for example tantalum, also comes within the scope of the invention.

What is claimed is:

1. A method for the impregnation of electrolytic capacitors by a tetracynanoquinodimethane (TCNQ) salt, consisting in the introduction of said salt into each capacitor by electrolytic means, using a solution formed by a solvent, wherein TCNQ has been dissolved, and containing a support electrolyte, the cation of the support electrolyte and the dissolved TCNQ leading, after electrolytic dissociation, to said TCNQ salt.

2. A method according to claim 1 wherein the capacitor has an aluminium anode.

3. A method according to claim 1, wherein the solvent is acetonitrile.

4. A method according to claim 1, wherein the cation of the support electrolyte is N-n butylisoquinolinium.

5. A method according to claim 4, wherein the support electrolyte is N-n butysilquinolinium hexafluorophosphate.

6. A method according to claim 1 wherein, with the electrolytic capacitors to be impregnated being provided with their cathode contacts, the anode and cathode of one and the same capacitor are electrically connected during the impregnating operation.

7. A method according to claim 2, wherein the solvent is acetonitrile and the support electrolyte is N-n butylisoquinolinium hexafluorophospate.

* * * * *